United States Patent [19]
Corda et al.

[11] Patent Number: 6,163,017
[45] Date of Patent: Dec. 19, 2000

[54] DEVICE FOR THE HIGH-PRECISION CONTROL OF A PHYSICAL QUANTITY SUCH AS THE TEMPERATURE OR HUMIDITY IN A HOUSEHOLD ELECTRICAL APPLIANCE

[75] Inventors: Andrea Corda, Luino; Adriano Scaburri, Somma Lombardo; Luigi Saporiti, Busto Arsizio, all of Italy

[73] Assignee: Whirlpool Corporation, Benton Harbor, Mich.

[21] Appl. No.: 09/280,046

[22] Filed: Mar. 26, 1999

[30] Foreign Application Priority Data

Mar. 27, 1998 [IT] Italy ................... MI98A0654

[51] Int. Cl.[7] ................ H05B 1/02; G01K 7/14; G01K 7/34
[52] U.S. Cl. ............... 219/497; 219/494; 219/492; 374/170
[58] Field of Search ............. 219/492, 494, 219/497, 507, 505; 374/170, 171

[56] References Cited

U.S. PATENT DOCUMENTS

| | | | |
|---|---|---|---|
| 3,149,224 | 9/1964 | Horne et al. | 219/497 |
| 3,553,429 | 1/1971 | Nelson | 219/497 |
| 3,586,830 | 6/1971 | Leitner et al. | 219/501 |
| 3,732,732 | 5/1973 | Trethewey | 374/170 |
| 3,872,728 | 3/1975 | Joyce et al. | 374/170 |
| 3,933,046 | 1/1976 | Ebrecht | 374/170 |
| 3,988,577 | 10/1976 | Leitner et al. | 364/138 |
| 4,013,872 | 3/1977 | Glass | 219/497 |
| 4,097,723 | 6/1978 | Leitner et al. | 219/494 |
| 4,159,648 | 7/1979 | Prosky | 374/170 |
| 4,197,581 | 4/1980 | Watrous et al. | 364/400 |
| 4,720,623 | 1/1988 | DiCesare et al. | 219/497 |
| 4,858,119 | 8/1989 | Waugh et al. | 364/400 |

Primary Examiner—Joseph Pelham
Attorney, Agent, or Firm—Robert O. Rice; Joel M. Van Winkle; Stephen D. Krefman

[57] ABSTRACT

A device for controlling a physical quantity set by a user, such as temperature or humidity, in a household electrical appliance such as an oven, a refrigerator or a washing-drying machine comprises, for measuring this physical quantity, at least one member operationally connected to control means for this quantity which operate on means for regulating this quantity, such as at least one electrical heating resistance element, a compressor of a refrigeration circuit or the like. The measuring member is connected to means for generating a square wave electrical signal the period of which is proportional to the value of the measured physical quantity, said electrical signal being evaluated by the control means which, on the basis of its frequency, determine a final value for said signal.

10 Claims, 1 Drawing Sheet

DEVICE FOR THE HIGH-PRECISION CONTROL OF A PHYSICAL QUANTITY SUCH AS THE TEMPERATURE OR HUMIDITY IN A HOUSEHOLD ELECTRICAL APPLIANCE

BACKGROUND OF THE INVENTION

1. Field of the Invention

This invention relates to a device for controlling a physical quantity set by a user, such as temperature or humidity, in a household electrical appliance such as an oven, a refrigerator, a washing-drying machine or the like, in accordance with the introduction to the main claim.

2. Description of the Related Art

In a household electrical appliance of the aforesaid type the physical quantity relative to it has to be controlled to an optimum level. This control is usually achieved by sensors or probes (such as an NTC or PTC resistor) which modulate an electrical signal of intensity corresponding to the quantity measured. These probes are connected to control means which, on the basis of the emitted signal, evaluate the value of the controlled quantity and compare it with the value set by the user. On the basis of this comparison, said control means act on usual regulating means (such as an electrical resistance element, a compressor of a refrigeration circuit, or a fan), to enable or disenable them in order to maintain the value of the measured quantity or to change it to the set value.

These probes are usually connected to analog/digital converters which, on the basis of the signal emitted by the probes, generate a binary numerical value which is fed to a corresponding microprocessor circuit (defining the control means) which makes the said comparison and acts on the regulating means in the aforedescribed manner.

Such a device with an analog/digital converter (usually of 8 bit type) has however a limited capacity for discriminating different levels of the controlled quantity. For example, in the case of an oven temperature, a device of the said type allows good temperature discrimination substantially between 0° C. and 250–300° C., but not beyond. If considerable precision is desired in discriminating higher temperatures (such as those often reached in pyrolysis ovens), the analog/digital converter capacity must be raised to at least 16 bits. However such a converter is of high cost, which considerably affects the overall cost of the temperature control device. Alternatively, this greater precision can be achieved by operating on the unit downstream of the converter, on the electronic circuitry associated with it and on its operative algorithm. However this solution is also costly and complicated, and negatively influences the cost of the finished device.

In addition, known devices exhibit problems in the form of thermal drift of the signals measured by their probes, this affecting the measurement accuracy and hence the appliance control precision. These problems appear in particular during the control of relatively low temperatures, of the order of some tens of a degree.

SUMMARY OF THE INVENTION

An object of this invention is to provide an improved device for controlling a physical quantity in a household electrical appliance.

A particular object of the invention is to provide a device of the aforesaid type which offers optimum discrimination of values of this physical quantity within a wide range, without this affecting the evaluation precision of these values and without resulting in an increased cost of the device compared with similar known devices.

These and further objects which will be apparent to an expert of the art are attained by a device in accordance with accompanying claims.

BRIEF DESCRIPTION OF THE DRAWINGS

The invention will be more apparent from the accompanying drawing, which is provided by way of non-limiting example and on which.

DESCRIPTION OF THE PREFERRED EMBODIMENT

Figure 1:
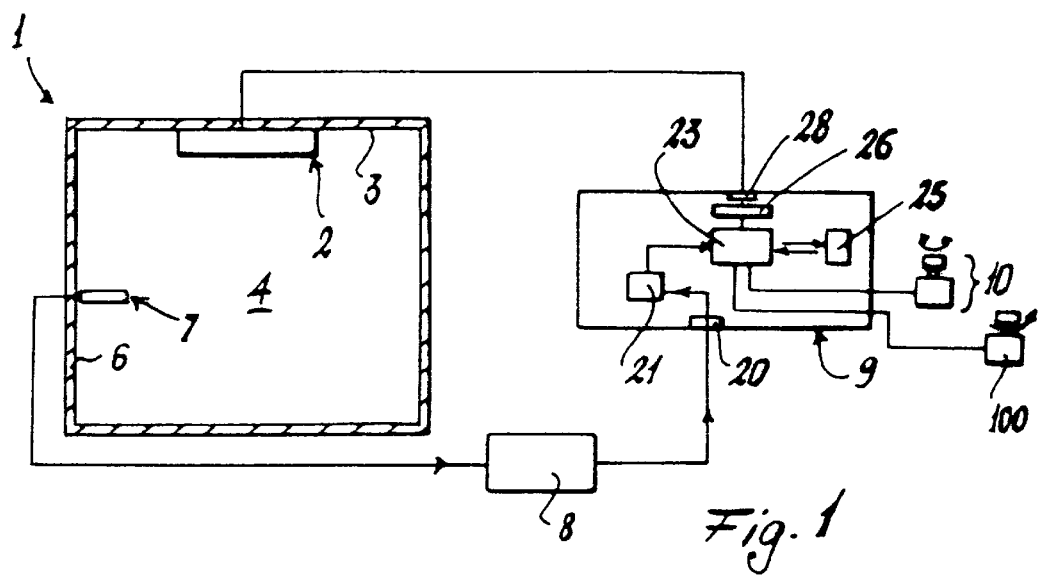
FIG. 1 is a schematic view of the device of the invention.

With reference to said figures, FIG. 1 shows an oven 1 containing a heating element 2, for example an electrical resistance element. This element is positioned for example on the ceiling 3 of a compartment 4 of the oven 1. Several heating elements can be positioned within the appliance in known manner, said elements possibly comprising members, of known type (for example microwave generators), for generating heat or for causing the heating of a food positioned in the compartment 4.

Figure 2:
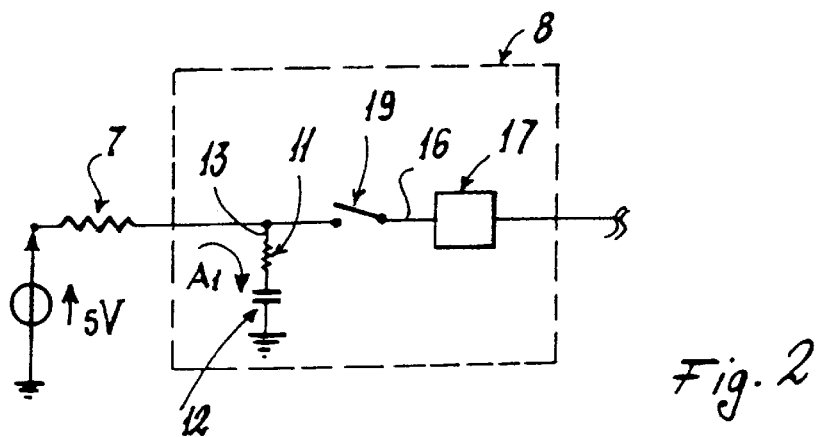
FIG. 2 is a schematic detailed view of a part of the device of FIG. 1.

In correspondence with a wall 6 of the compartment 4 there is positioned a usual temperature measurement probe 7, preferably an electrical resistor of PTC type (as shown in FIG. 2). Other temperature measurement probes or members can be positioned in the oven 1, such as a probe positioned within the food itself, or a further electrical resistor of PCT type.

The measurement probe or member 7 is connected to a square wave generator circuit 8 which is connected to a control unit 9 for the physical quantity (temperature) measured by the probe 7. The unit 9 is connected to a usual member (such as a knob) 10 for selecting the heating power associated with the element 2 and, on the basis of the temperature selection made by the user via a suitable selector member 100, acts on the heating element to activate it (in known manner) for the time required to obtain the user's selected temperature within the compartment 4. The unit 9 is (preferably) a microprocessor unit. It can however comprise an electrical circuit with comparator members performing the same functions as a microprocessor unit.

Specifically, the square wave generator 8 comprises an internal electrical resistor 11 (or reference resistor) in series with a capacitor 12 connected to earth. The electrical branch 13 into which the resistor and capacitor are connected is connected to the probe 7 (represented by way of example, as stated, by an electrical resistor) and to a branch 16 comprising a switch 19 controlled by an internal control unit 17 of the generator 8 acting as a comparator. Finally, this unit generates a square wave electrical signal representative of the value of the physical quantity measured by the probe 7. In this respect, the electrical signal A1 (current) modulated by the probe 7 flows to the capacitor 12 as initially the switch 19 is open. In this manner the capacitor becomes charged. When this has been charged, the unit 17 closes the switch 19 and the capacitor 12 discharges within the unit. In this manner output signals are produced from the unit 17 during the capacitor charging period (Ton), whereas the signals are annulled during the discharge period (Toff).

Figure 3:
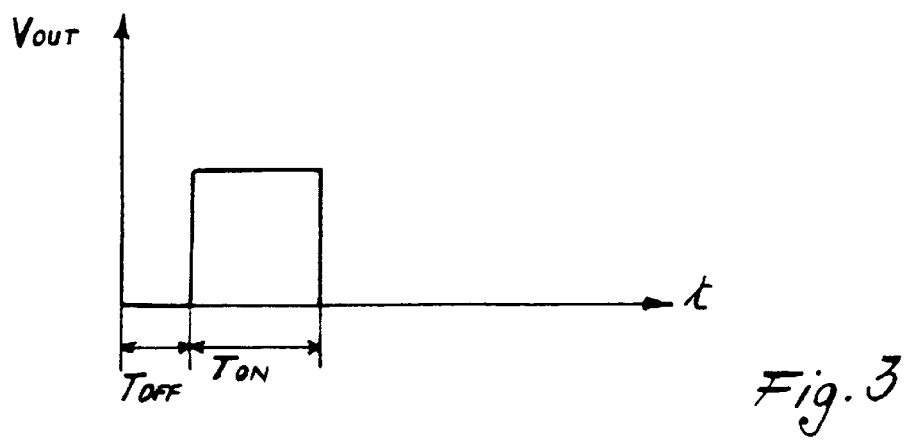
FIG. 3 is a time-voltage graph showing the pattern of an electrical signal generated by the device of FIG. 1.

This charge/discharge cycle is represented by the square waves generated by the unit 17 and represented in FIG. 3. In particular, said waves have a higher frequency the higher the temperature measured by the probe 7 if the probe 7 is an electrical resistor of NTC type. The opposite is valid if the probe is a PCT resistor.

Because of the manner in which the square waves are generated, the temperature measurement is not influenced by thermal drift of the probe 7 because this is compensated by the ratio, determined by the unit 17, of the signals measured during the charging and discharge of the capacitor. In this manner, the square wave electrical signal emitted by the generator 8 is effectively represented by the measured physical quantity and can be effectively used by the unit 9 to determine the value of this quantity, in order to compare it with that set by the user and achieve optimum control of the heating element 2.

The square wave signal enters the unit 9 (for example a microprocessor) via an input gate 20 directly connected to a counter 21. This counter 21 "counts" the duration, i.e. the ON-OF period of the square waves (their rising fronts) per unit of time, so discriminating within the unit of time the signal ON and OFF periods, and feeds the count to a control member 23 of the unit 9. From these measured periods (T on and T off), the member 23 obtains a parameter R related to the signal emitted by the generator 8. The member 23 obtains the ratio of T on to T off, the result of which is a value depending on the probe (parameterized) and is hence representative of the true temperature read by it. The value of R is compared with preset values stored in a memory 25 so as to obtain a final value for the controlled quantity (temperature). This value is then compared with that set by the user via the knob 10. On the basis of this comparison the member 23 activates that internal portion 26 of the unit 9 provided for controlling the operation of the element 2. The portion 26 hence generates a signal which leaves via an output gate 28 of the unit 9 to reach the element 2. If the temperature measured by the probe 7 differs from the set temperature, the unit 9 maintains the element 2 activated. Otherwise it deactivates element 2.

Because of the use of the square wave generator 8, values of a controlled physical quantity (temperature in this example) can be discriminated in a virtually infinite succession within a wide range (for example 0–600° C.). This is achieved at low cost, comparable with the cost of a known device using an analog/digital converter (but with greater precision than an analog/digital converter). Moreover, the device of the invention is not influenced by thermal drift or by evaluation errors deriving from its components, as such errors (generated outside the unit 9) are automatically compensated by the method of operating the square wave generator. One embodiment of the invention has been described applied to an oven, however the invention can also be applied to a refrigerator to control its operation. In this case, at least one probe 7 is positioned within a compartment of the refrigerator, and the unit 9 controls the compressor operation. In the case of a refrigerator the device of the invention can also be used to indirectly control the state of the refrigerant fluid and hence control the compressor operation. Alternatively or additionally, the device of the invention can be used to control the refrigerator defrosting stage.

The invention can also be used in a dryer or washing-drying machine to measure the temperature and/or humidity of the air circulating through the appliance. On the basis of this or these measured values, the drying process can be halted at a predetermined fabric moisture content (preset in the memory 25). If particular temperature and moisture content values for different fabrics are stored in the memory 25, and the unit 9 is informed of the actual fabric type, the appliance operation will be related to the type of fabric being treated.

We claim:

1. A device for controlling a physical quantity, such as temperature or humidity, which is set by a user in a household electrical appliance such as an oven, a refrigerator or a washing-drying machine, said device comprising:

at least one measuring member for measuring the physical quantity, an electrical signal generator means connected to the measuring member, the at least one measuring member feeding an electrical signal (A1) corresponding to the value of the measured quantity to the electrical signal generator means, the signal generated by said signal generator means being proportional to the value of the measured physical quantity, a control means operatively connected to said measuring member, said electrical signal emitted by said signal generator means being fed to the control means, regulating means for regulating the physical quantity, the regulating means being operatively connected to the control means, wherein said control means measures the ON and OFF period of the electrical signal emitted by said signal generator means and on the basis of the ratio of the ON and OFF period evaluates and measures a finite value of the physical quantity, said finite value then being compared with a reference value set by the user, the control means acting on the regulating means for the controlled quantity such that the value of the measured quantity is made equal to and/or maintained at the set value.

2. A device as claimed in claim 1, wherein the signal generator means is a square wave generator.

3. A device as claimed in claim 2, wherein the square wave generator comprises compensator means arranged to enable said square wave generator to emit a signal without thermal drift and effectively representative of the physical quantity value measured by the measurement member.

4. A device as claimed in claim 3, wherein the compensator means are an electrical resistor in series with a capacitor.

5. A device as claimed in claim 2, wherein:

the electrical signal generator means includes a capacitor charged through a resistor wherein when the capacitor has been fully charged, the capacitor is discharged such that the output signal from the electrical signal generator means is divided into a capacitor charging ON period and a discharging OFF period, and the control means comprise a member acting as a counter to which the signal emitted by the square wave generator is fed, said member measuring the ON and OFF period per unit of time, of the signals received by said generator.

6. A device as claimed in claim 5, wherein the control means comprise a control member cooperating with a memory member in which data are present relative to values of the controlled physical quantity which are to be compared with corresponding values of this quantity deduced from the ratio of the ON to the OFF period of the signal emitted by the square wave generator, said control member receiving the set quantity value and acting on a command member for the operation of the controlled quantity regulating means.

7. A device as claimed in claim 5, wherein the control member is connected to the member acting as the counter, the data generated by this counter enables this control member to evaluate the ON period and OFF period of the electrical signal emitted by the square wave generator in order to calculate a ratio between these periods and define a value of the controlled physical quantity which is homogeneous with the values memorized in the memory member, said control member comparing the measured physical quantity with those memorized to define a final value for this quantity, to be compared with that set by the user, said comparison enabling said control member to operate on the member commanding the operation of the controlled quantity regulating means, in order to make this quantity equal to the set value and to maintain this equality.

8. A device as claimed in claim 6, wherein the control member is connected to the member acting as the counter, the data generated by this counter enables this control member to evaluate the ON period and OFF period of the electrical signal emitted by the square wave generator in order to calculate a ratio between these periods and define a value of the controlled physical quantity which is homogeneous with the values memorized in the memory member, said control member comparing the measured physical quantity with those memorized to define a final value for this quantity, to be compared with that set by the user, said comparison enabling said control member to operate on the command member commanding the operation of the controlled quantity regulating means, in order to make this quantity equal to the set value and to maintain this equality.

9. A device as claimed in claim 1, wherein the control means is a microprocessor unit.

10. A device for controlling a temperature in an oven compartment, the temperature being set by a user, the device comprising:

a temperature sensor for measuring the temperature in the oven compartment, a signal generating circuit connected to the temperature sensor, the temperature sensor feeding an electrical signal (A1) corresponding to the value of the measured temperature to the signal generating circuit, the signal generated by the signal generating circuit being proportional to the value of the measured temperature, a control means operatively connected to the temperature sensor, the electrical signal emitted by the signal generating circuit being fed to the control means, a heating element disposed within the oven compartment for regulating the temperature within the oven compartment, the heating element being operatively connected to the control means, wherein the control means measures the ON and OFF period of the electrical signal emitted by said signal generating circuit and on the basis of the ratio of the ON and OFF period evaluates and measures a finite value of the temperature, the finite value then being compared with a reference value set by the user, the control means acting on the heating element such that the oven compartment temperature is made equal to and/or maintained at the set value.

* * * * *